United States Patent Office 2,939,852
Patented June 7, 1960

2,939,852
ISOBORNYL METHACRYLATE MODIFIED RUBBER, LATEX CONTAINING SAME AND ARTICLE THEREOF

Claude J. Schmidle, Moorestown, N.J., assignor to Rohm & Haas Company, Philadelphia, Pa., a corporation of Delaware No Drawing. Filed Nov. 26, 1957, Ser. No. 698,931

18 Claims. (Cl. 260—2.5)

This application concerns the production of improved polymers of elastomeric type and is particularly concerned with certain isobornyl methacrylate-grafted natural and synthetic rubber polymers.

In accordance with the present invention, it is an object of the invention to provide improved polymer dispersions containing graft copolymers of isobornyl methacrylate with natural rubber or certain synthetic rubber polymers of butadiene, isoprene, or chloroprene. The improved polymer latices of the present invention are particularly useful in the production of foamed or cellular products such as are commonly termed "foam-rubber." In the making of foam-rubber products, it has heretofore been suggested to employ styrene or methyl methacrylate grafts of the natural or synthetic rubber polymer latex in order to increase the compression modulus, that is, to increase the load-bearing capacity for a given depression or indentation of the foamed material. However, when the styrene or methyl methacrylate grafts are used in the making of foam-rubber products, there is a severe loss in the compression modulus after the foamed mass has been subjected to even a normal amount of flexing. It has been found that the grafting of isobornyl methacrylate on natural rubber or on certain synthetic rubber copolymers serves to increase the compression modulus of foamed products, and that the increase thereby obtained suffers relatively little loss as a result of the normal flexing of the cellular mass.

In accordance with the present invention, isobornyl methacrylate is grafted upon the polymer existing in a natural rubber latex or in a synthetic latex obtained by the emulsion copolymerization of 60 to 85% by weight of isoprene, chloroprene, or butadiene with 15 to 40% by weight of styrene, methylstyrene, or acrylonitrile. Best results are obtained when the amount of excess surface active agent over that required to confer adequate stability to the latex is kept at a minimum and provided that short-stops, antioxidants and other additives are not of such a nature or present in sufficiently large quantities so as to inhibit or seriously retard the polymerization and grafting of the isobornyl methacrylate. Typical commercially available synthetic rubber latices are described by Cook in "Latex-Natural and Synthetic," Rheinhold (1956). In the case of the synthetic polymers, the grafting is preferably carried out on copolymers of butadiene with styrene, that is polymers containing from 60 to 85% by weight of the butadiene to 15 to 40% by weight of styrene.

The proportion of isobornyl methacrylate may be from 1 to 75% by weight of the entire weight of the final grafted copolymer obtained from natural or synthetic rubber latex. In other words, the ratio of isobornyl methacrylate to initial polymer solids of the original latex is from 1:100 to 3:1. In the preparation of foam-rubber materials, in order to provide cellular products having good flexibility, it is generally preferred that the proportion of isobornyl methacrylate be from 5 to 15% by weight of the graft copolymer when the foam-rubber article is to be made entirely from the graft copolymer. If rigid foams are desired, a higher proportion of isobornyl methacrylate may be present even up to the 75% upper limit specified hereinabove and a fluxing aid, such as a removable plasticizer, may be used in amounts up to about 30% on the weight of the graft copolymer. Alternatively, the foam may be formed at high temperature without a plasticizer using a heat-sensitive gelling agent. Higher percentages above 15% on up to 75% of isobornyl methacrylate may be present in such graft copolymers to be used for making a flexible foamed product; but in such case, the graft copolymer is blended with a natural rubber or synthetic-rubber latex which lacks the isobornyl methacrylate.

For blending, there may be used either natural rubber latices or latices of synthetic rubbers generally known to the art as butalastic polymers such as are prepared by polymerizing diolefins, halogen-substituted or other substituted diolefins, or by copolymerizing diolefins with other copolymerizable monoethylenically unsaturated compounds containing vinyl or vinylidene groups such as acrylonitrile, acrylates (e.g., methyl, ethyl, or butyl acrylates or methacrylates), styrene, halogen-substituted styrenes (e.g., mono- or di-chlorostyrenes or mono- or di-bromostyrenes), or alkylstyrenes such as methylstyrenes or dimethylstyrenes. More particularly, the butalastic polymers may be obtained by polymerizing a conjugated diolefin such as butadiene, isoprene, dimethylbutadiene, and chloroprene, or by copolymerizing butadiene and styrene, butadiene and vinyltoluene, butadiene and acrylonitrile, butadiene and isobutylene, or isoprene and isobutylene. Generically, butalastic polymers are defined by Marchionna [Marchionna, "Butalastic Polymers," Rheinhold (1946)] as synthetic, elastic polymers of a butadiene compound with or without other compounds polymerizable therewith.

Thus, the graft copolymer may be mixed with an amount of natural latex or of a synthetic latex of the type just described such that the overall weight percent of isobornyl methacrylate in the blended composition is from 1 to 15%. Of course, blended systems may be employed to provide rigid foams in which the overall percentage of isobornyl methacrylate in the blend is above 15% by weight. Generally, a blending technique is desirable because of the greater ease of preparing isobornyl methacrylate graft copolymers in which at least 20% by weight of isobornyl methacrylate is polymerized in the copolymer. However, graft copolymers containing as low as 1% by weight of isobornyl methacrylate polymerized therein can be obtained and may be used.

It is well known that the cellular products obtained from natural rubber are somewhat stronger (tensile) than those obtained from certain synthetic polymers, such as butadiene-styrene copolymers. On the other hand, it is often possible to obtain cellular products of lower density and also of lower cost per unit weight from butadiene-styrene copolymers than from natural rubber. Similar effects are still manifest in the isobornyl-graft copolymers so that products having various combinations of properties are obtainable by the choice of the elastomeric polymer or polymer mixture on which grafting is performed.

Other monomers may be grafted on to the polymer of the latex simultaneously with the isobornyl methacrylate. Examples of such other monomers include methyl methacrylate, styrene, divinylbenzene, and acrylonitrile. When the grafting is done with a mixture of one or more of such other monomers with isobornyl methacrylate, the proportion of the latter in the mixture should be at least one fifth thereof. In general, the preparation of the graft copolymer is obtained by introducing into the latex of natural rubber or synthetic rubber a solution of a polymerization initiator in the isobornyl methacrylate such that the amount of initiator introduced with the isobornyl methacrylate, whether this monomer is added in a single addition or by a series of aliquot portions, is from about 0.1% to 1% of the total weight of polymer and monomer in the system. After stirring in the monomer and initiator over a period of time to assure that the monomer is absorbed by the particles of polymer in the latex such as from 1 to 4 hours, a polymerization activator may be added. After the addition of the activator which is thoroughly mixed into the system by stirring, the batch is held at the desired temperature preferably about 28°–35° C. until polymerization is completed such as from one hour to several hours. Instead of adding all of the initiator with the monomer and the entire amount of activator in a single step, a portion only of the initiator may be put into the monomer; and after the absorption of the monomer on the latex particles, only a portion of the activator may be added in which event additional portions of initiator and activator may be added periodically during the final polymerization period.

As initiators any free-radical initiator may be used of which the peroxygen compounds are representative. Organic peroxides and hydroperoxides as well as hydrogen peroxide and inorganic persulfates are useful. Examples include benzoyl peroxide, cumene hydroperoxide, t-butyl hydroperoxide, phenylcyclohexane hydroperoxide, and ammonium or potassium persulfate.

Various activators may be employed such as the polyalkyleneamines generally including ethylenediamine, diethylenetriamine, triethylenetetramine, and tetraethylenepentamine. When no ammonia is present, sodium-formaldehyde sulfoxylate may be employed as an activator. The alkali metal hydrosulfites or metal bisulfites may also be employed as activators.

The proportion of activator may be comparable to that of the initiator such as from about 0.1% to 1% by weight of the total of the polymer and monomer weights. Besides employing activators, promoters such as traces of copper, silver, or iron ions may be employed.

In the following examples, the parts and percentages are by weight unless otherwise indicated. The compression modulus values are those obtained by using the Instron and were obtained before flexing and again on the same samples after 100,000 compressions to 50% of original volume at a frequency of 60 compressions per minute. The indentation value was determined by measuring the load required to effect an indentation of 25% by a 4 sq. inch circular indentor foot in the foamed specimen having an area of approximately 17 sq. inches.

*Example 1*

(a) Natural rubber latex (1122 parts of 62.4% solids) was introduced into a reaction vessel. A solution of 2.5 parts of cumene hydroperoxide in 300 parts of isobornyl methacrylate was added slowly with stirring over the course of thirty minutes and the mixture was stirred for two hours. Twenty-five parts of a 10% aqueous solution of tetraethylene pentamine and 50 parts of a 0.1% aqueous solution of ferrous sulfate were added with stirring. The mixture was agitated slowly and maintained at a temperature of 30–35° C. by cooling. The following additional increments of initiator and activator were then added at intervals of one-half hour:

(a) 2.5 parts of cumene hydroperoxide
(b) 25 parts of a 10% aqueous solution of sodium formaldehyde sulfoxylate
(c) 2.5 parts of cumene hydroperoxide
(d) 25 parts of a 10% aqueous solution of sodium formaldehyde sulfoxylate One-half hour after the last addition, 50 parts of a 25% aqueous triethanolamine oleate solution was added to stabilize the latex. It was deammoniated by blowing air over the surface with slow agitation until the ammonia content had dropped to 0.15– 0.20%. The solids content was adjusted to 61.5% by the addition of deionized water.

(b) Another portion of the same natural latex (1122 parts of 62.4% solids) was introduced into a reaction vessel. A solution of 2.5 parts of cumene hydroperoxide in 300 parts of methyl methacrylate was added slowly with stirring over the course of thirty minutes and the mixture was stirred for two hours. Twenty-five parts of a 10% aqueous solution of tetraethylenepentamine and 50 parts of a 0.1% aqueous solution of ferrous sulfate were added with stirring. The mixture was agitated slowly and maintained at a temperature of 30–35° C. by cooling. The following additional increments of initiator and activator were then added at intervals of one-half hour:

(a) 2.5 parts of cumene hydroperoxide
(b) 25 parts of a 10% aqueous solution of sodium formaldehyde sulfoxylate
(c) 2.5 parts of cumene hydroperoxide
(d) 25 parts of a 10% aqueous solution of sodium formaldehyde sulfoxylate One-half after the last addition, 50 parts of a 25% aqueous triethanolamine oleate solution was added to stabilize the latex. It was deammoniated by blowing air over the surface with slow agitation until the ammonia content had dropped to 0.15 to 0.20%. The solids content was adjusted to 61.5% by the addition of deionized water.

(c) Another portion of the same natural rubber latex (1122 parts of 62.4% solids) was introduced into a reaction vessel. A solution of 2.5 parts of cumene hydroperoxide in 200 parts of methyl methacrylate and 100 parts of isobornyl methacrylate was added slowly with stirring over the course of thirty minutes and the mixture was stirred for two hours. Twenty-five parts of a 10% aqueous solution of tetraethylene pentamine and 50 parts of a 0.1% aqueous solution of ferrous sulfate were added with stirring. The mixture was agitated slowly and maintained at a temperature of 30–35° C. by cooling. The following additional increments of initiator and activator were then added at intervals of one-half hour:

(a) 2.5 parts of cumene hydroperoxide
(b) 25 parts of a 10% aqueous solution of sodium formaldehyde sulfoxylate
(c) 2.5 parts of cumene hydroperoxide
(d) 25 parts of a 10% aqueous solution of sodium formaldehyde sulfoxylate One-half hour after the last addition, 50 parts of a 25% aqueous triethanolamine oleate solution was added to stabilize the latex. It was deammoniated by blowing air over the surface with slow agitation until the ammonia content had dropped to 0.15 to 0.20%. The solids content was adjusted to 61.5% by the addition of deionized water.

*Example 2*

(a) Thirty-one parts of 25% triethanolamine oleate was added to 1000 parts of the same natural latex as used in Example 1 containing 62.4% solids. The mixture was deammoniated by blowing air over the surface, with agitation, until the free ammonia content had dropped to 0.15% to 0.20%. The solids content of the deammoniated latex was adjusted to 61.5% by the addition of deionized water.

(b) Twenty-seven parts of the deammoniated natural rubber latex of part (a) (61.5% solids) was mixed with 27 parts of the isobornyl methacrylate modified latex (61.5% solids) of Example 1(a) and 108 parts of GR–S 2105 latex (61.5% solids) (cold process 70% butadiene and 30% styrene). Triethanolamine oleate (8.35 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 20% dispersion of sodium silicofluoride was added to effect coagulation. After an additional 20-25 seconds of whipping, the batch was poured into aluminum molds, which were covered and placed in a steam bath. These were heated to 100° C. for forty-five minutes to effect vulcanization. After cooling, the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foams, which contained 2 parts of GR-S 2105 synthetic rubber to 1 part of isobornyl methacrylate modified natural rubber, had a density of 0.096 gram per cc. and contained 5% isobornyl methacrylate. The indentation value in pounds per square inch to effect 25% depression was 0.52. The Instron compression modulus at 25% compression was 0.24 pound per square inch and at 50% compression it was 0.72 pound per square inch. After 100,000 compressions to 50% of original volume at a frequency of 60 compressions per minute, the Instron compression modulus at 25% compression was 0.22 pound per square inch and at 50% compression it was 0.69 pound per square inch.

(c) Twenty-seven parts of the deammoniated natural rubber latex of part (a) (61.5% solids) was mixed with 27 parts of the methyl methacrylate modified latex (61.5% solids) of Example 1(b) and 108 parts of GR-S 2105 latex (61.5% solids). Triethanolamine oleate (8.35 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 20% dispersion of sodium silicofluoride was added to effect coagulation. After an additional 20-25 seconds of whipping, the batch was poured into aluminum molds which were covered and placed in a steam bath. These were heated to 100° C. for forty-five minutes to effect vulcanization. After cooling, the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foams, which contained 2 parts of GR-S 2105 synthetic rubber to 1 part of methyl methacrylate modified natural rubber, had a density of 0.096 gram per cc. and contained 5% methyl methacrylate. The indentation value in pounds per square inch to effect 25% depression was 0.41. The Instron compression modulus at 25% compression was 0.21 and at 50% compression it was 0.65 pound per square inch. After 100,000 compressions to 50% of original volume at a frequency of 60 compressions per minute, the Instron compression modulus at 25% compression was 0.16 pound per square inch and at 50% compression it was 0.50 pound per square inch.

*Example 3*

(a) Fifty-four parts of the deammoniated natural rubber latex of Example 2(a) (61.5% solids) was mixed with 108 parts of GR-S 2105 latex (61.5% solids). Triethanolamine oleate (8.35 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 20% dispersion of sodium silicofluoride was added to effect coagulation. After an additional 20-25 seconds of whipping, the batch was poured into aluminum molds which were covered and placed in a steam bath. These were heated to 100° °C. for forty-five minutes to effect vulcanization. After cooling, the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foam, which contained 2 parts of GR-S 2105 synthetic rubber to 1 part of natural rubber, had a density of 0.091 gram per cc. The indentation value in pounds per square inch to effect 25% depression was 0.29. The Instron compression modulus at 25% compression was 0.14 pound per square inch and at 50% compression it was 0.40 pound per square inch. After 100,000 compressions to 50% of original volume at a frequency of 60 compressions per minute, the Instron compression modulus at 25% compression was 0.13 pound per square inch and at 50% compression it was 0.36 pound per square inch.

A foam of identical composition whipped at a slower speed to a lower volume had a density of 0.119 gram per cc. and an indentation value of 0.46 pound per square inch to effect 25% depression.

(b) Fifty-four parts of the isobornyl methacrylate modified latex of Example 1(a) (61.5% solids) was mixed with 108 parts of GR-S 2105 synthetic rubber latex (61.5% solids). Triethanolamine oleate (8.35 parts of 25% aqueous solution) was added to give a total of 10 parts of 25% solution per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 20% dispersion of sodium silicofluoride was added to effect coagulation. After an additional 20-25 seconds of whipping, the mix was poured into aluminum molds, which were covered and placed in a steam bath. These were heated to 100° C. for forty-five minutes to effect vulcanization. After cooling, the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foams, which contained 2 parts of GR-S 2105 synthetic rubber to 1 part of modified natural rubber, had a density of 0.093 gram per cc. and contained 10% isobornyl methacrylate. The indentation value in pounds per square inch to effect 25% depression was 0.64.

*Example 4*

Fifty-four parts of the modified latex of Example 1(c) (61.5% solids) was mixed with 108 parts of GR-S 2105 latex (61.5% solids). Triethanolamine oleate (8.35 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 20% dispersion of sodium silicofluoride was added to effect coagulation. After an additional 20–25 seconds of whipping, the batch was poured into aluminum molds which were covered and placed in a steam bath. These were heated to 100° C. for forty-five minutes to effect vulcanization. After cooling the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foams, which contained 2 parts of GR–S 2105 synthetic rubber to 1 part of modified natural rubber, had a density of 0.096 gram per cc. and contained 6.7% methyl methacrylate and 3.3% isobornyl methacrylate. The indentation value in pounds per square inch to effect 25% depression was 0.55. The Instron compression modulus at 25% compression was 0.30 pound per square inch and at 50% compression it was 1.0 pound per square inch.

*Example 5*

Eighty-one parts of the deammoniated latex of Example 2(a) containing 61.5% solids was mixed with 27 parts of the isobornyl methacrylate graft latex (61.5% solids) of Example 1(a) and 54 parts of GR–S 2105 synthetic rubber latex (61.5% solids). Triethanolamine oleate (6.7 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Ten parts of a 20% dispersion of sodium silicofluoride was added to effect coagulation. After an additional 20–25 seconds of whipping, the batch was poured into aluminum molds which were covered and placed in a steam bath. These were heated to 100° C. for forty-five minutes to effect vulcanization. After cooling, the foams were removed from the molds, washed in cold water, and wrung dry between squeeze rollers, the washing and squeeze drying being repeated several times. The foams were then dried in an oven at 100° C. for ninety minutes and allowed to age twenty-four hours at room temperature before testing.

The resulting foam contained 5% isobornyl methacrylate and had a density of 0.091 grams per cc. The indentation value in pounds per square inch to effect 25% depression was 0.62. The Instron compression modulus at 25% compression was 0.27 pound per square inch and at 50% compression it was 0.92.

(b) One-hundred-eight parts of the deammoniated latex of Example 2(a) (61.5% solids) was mixed with 54 parts of GR–S 2105 synthetic rubber latex (61.5% solids). Triethanolamine oleate (6.7 parts of 25% aqueous solution) was added to give a total of 10 parts per 100 parts of latex solids. The mixture was whipped at high speed and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Ten parts of a 20% dispersion of sodium silicofluoride was added to effect coagulation. After an additional 20–25 seconds of whipping, the batch was poured into aluminum molds which were covered and placed in a steam bath. These were heated to 100° C. for forty-five minutes to effect vulcanization. After cooling, the foams were removed from the molds, washed in cold water, and wrung dry between squeeze rollers, the washing and squeeze drying being repeated several times. The foams were then dried in an oven at 100° C. for ninety minutes and allowed to age twenty-four hours at room temperature before testing.

The resulting foam, which contained no isobornyl methacrylate, had a density of 0.093 gram per cc. The indentation value in pounds per square inch to effect 25% depression was 0.39. The Instron compression modulus at 25% compression was 0.17 pound per square inch and at 50% compression it was 0.47.

A foam of identical composition but whipped at a slower speed to a lower volume had a density of 0.106 gram per cc. and an indentation value of 0.49 pound per square inch to effect 25% depression.

The use of ethyl methacrylate, n-butyl methacrylate, isobutyl methacrylate, or p-ethoxyethyl methacrylate gave softer polymers than those containing the same amount of methyl methacrylate. Foams prepared from these higher methacrylates had lower moduli of compression than those containing methyl methacrylate.

*Example 6*

(a) GR–S 2105 synthetic rubber latex (1465 parts of 61.5% solids) was introduced into a reaction vessel. A solution of 2.5 parts of cumene hydroperoxide in 100 parts of isobornyl methacrylate was added slowly with stirring over the course of thirty minutes and the mixture was stirred for two hours. Twenty-five parts of a 10% aqueous solution of tetraethylene pentamine and 50 parts of a 0.1% aqueous solution of ferrous sulfate were added with stirring. The mixture was agitated slowly and maintained at a temperature of 30–35° C. The following additional increments of initiator and activator were then added at intervals of one-half hour:

(a) 2.5 parts of cumene hydroperoxide
(b) 25 parts of a 10% aqueous solution of sodium formaldehyde sulfoxylate
(c) 2.5 parts of cumene hydroperoxide
(d) 25 parts of a 10% aqueous solution of sodium formaldehyde sulfoxylate One-half hour after the last addition, 50 parts of a 25% aqueous triethanolamine oleate solution was added to stabilize the latex.

One-hundred-seventy-five parts of the isobornyl methacrylate modified GR–S 2105 synthetic rubber latex was mixed with 5 parts of a 25% aqueous triethanolamine oleate solution. The mixture was whipped and 5 parts of a 50% aqueous sulfur dispersion, 1.9 parts of a 40% aqueous dispersion of zinc diethyldithiocarbamate, and 2.5 parts of a 40% aqueous dispersion of the zinc salt of mercaptobenzothiazole were added. After six minutes, 12.5 parts of a 40% aqueous dispersion of zinc oxide was added and the mixture was whipped for an additional two minutes. Fifteen parts of a 40% dispersion of sodium silicofluoride was added to effect coagulation. After an additional 20–25 seconds of whipping, the batch was poured into aluminum molds which were covered and placed in a steam bath. They were heated at 100° C. for forty-five minutes to effect vulcanization. After cooling, the foams were removed from the molds, washed in cold water, and wrung dry between squeeze rollers, the washing and wringing being repeated several times. The foams were then dried in an oven at 100° C. for ninety minutes and allowed to age twenty-four hours at room temperature before testing.

The resulting foam, which consisted of GR–S 2105 synthetic rubber modified with 10% isobornyl methacrylate, had a density of 0.093. The Instron compression modulus at 25% compression was 0.15 pound per square inch and at 50% compression it was 0.45 pound per square inch.

The physical properties of the foam resembled those of foams prepared from a 1:1 ratio of unmodified natural rubber and GR–S 2105 latices.

Foams prepared in a similar manner from unmodified GR–S 2105 latex were very poor in quality, having a tendency to collapse before vulcanization was complete. The resulting foams were also very weak.

(b) GR–S 2105 synthetic rubber latex (1465 parts of 61.5% solids) was introduced into a reaction vessel. A solution of 2.5 parts of cumene hydroperoxide in 100 parts of methyl methacrylate was added slowly with stirring over the course of thirty minutes and the mixture was stirred for two hours. Twenty-five parts of a 10% aqueous solution of tetraethylene pentamine and 50 parts of a 0.1% aqueous solution of ferrous sulfate were added with stirring. The mixture was agitated slowly and maintained at a temperature of 30–35° C. The reaction mixture gelled and could not be used for the preparation of foam.

Example 7

(a) Three-hundred-thirty parts of GR–S 2003 (hot processes 70% butadiene and 30% styrene) synthetic rubber latex (60.5% solids) was mixed with 2.5 parts of sodium lauryl sulfate and 475 parts of deionized water. A solution of 0.5 part of cumene hydroperoxide in 150 parts of methyl methacrylate and 150 parts of isobornyl methacrylate was added and the mixture was stirred for one hour. The mixture was heated to 70° C. and 5 parts of a 0.1% aqueous solution of ferrous sulfate was added along with 10 parts of 10% sodium formaldehyde sulfoxylate. After approximately ten minutes an exothermic polymerization reaction began and cooling was necessary to maintain the temperature between 65° C. and 70° C. The mixture was allowed to stir for sixteen hours, an additional 0.5 part of cumene hydroperoxide was added and the temperature was raised to 68° C. Five parts of 10% sodium formaldehyde sulfoxylate was added. There was no further exothermic reaction. The mixture was cooled to room temperature.

(b) Cellular products having greater resistance to solvents than those obtained hereinabove are produced by the procedure of Example 6 but substituting an aqueous dispersion of a copolymer of about 30% of acrylonitrile with about 70% of butadiene for the GR–S 2105.

The graft copolymer dispersions of the present invention may also be used for coating paper, textiles, leather, and metals, especially wires.

I claim:

1. A water-insoluble polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer.

2. A water-insoluble polymer of isobornyl methacrylate obtained by polymerizing isobornyl methacrylate by means of a free-radical polymerization initiator in a natural rubber latex, the proportion of isobornyl methacrylate being from 1 to 75% by weight of the resultant polymer.

3. A water-insoluble polymer of isobornyl methacrylate obtained by polymerizing isobornyl methacrylate and methyl methacrylate by means of a free-radical polymerization initiator in an aqueous dispersion of a polymer selected from the group consisting of natural rubber and copolymers of 60 to 85% by weight of a conjugated diolefin with 15 to 40% of a member selected from the group consisting of styrene, methylstyrene, and acrylonitrile, the total amount of isobornyl methacrylate and methyl methacrylate being from 5 to 75% of the weight of the resultant polymer and the proportion of isobornyl methacrylate being at least 20% of the total weight of the methacrylates.

4. An aqueous dispersion of a water-insoluble polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer.

5. An aqueous dispersion of a water-insoluble polymer of isobornyl methacrylate obtained by polymerizing isobornyl methacrylate by means of a free-radical polymerization initiator in an aqueous dispersion of a natural rubber, the proportion of isobornyl methacrylate being from 1 to 75% by weight of the resultant polymer.

6. An aqueous dispersion of a water-insoluble polymer of isobornyl methacrylate obtained by polymerizing isobornyl methacrylate by means of a free-radical polymerization initiator in an aqueous dispersion of a polymer of 60 to 85% of butadiene and 40 to 15% respectively of styrene, the proportion of isobornyl methacrylate being from 1 to 75% by weight of the resultant polymer.

7. An aqueous dispersion of a water-insoluble polymer of isobornyl methacrylate obtained by polymerizing isobornyl methacrylate and methyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the total amount of isobornyl methacrylate and methyl methacrylate being from 1 to 75% of the weight of the resultant polymer and the proportion of isobornyl methacrylate being from 1/3 to 2/3 of the total weight of methacrylate.

8. An aqueous dispersion of a mixture of water-insoluble polymers comprising (1) a polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 5 to 75% by weight of the resultant polymer, and (2) a natural rubber.

9. An aqueous dispersion of a mixture of water-insoluble polymers comprising (1) a polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer, and (2) a polymer of 60 to 100% of butadiene and up to 40% of styrene.

10. An aqueous dispersion of a mixture of water-insoluble polymers comprising (1) a polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer, (2) a natural rubber, and (3) a polymer of 60 to 100% of butadiene with up to 40% of styrene.

11. As an article of manufacture, a cellular mass formed of a compsition comprising a water-insoluble polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjungated diolefin with 15 to 40% by weight of a member selected from the group consisting of styrene, methylstyrene, and acrylonitrile, the proportion of isobornyl methacrylate being from 1 to 75% by weight of the resultant polymer.

12. As an article of manufacture, a cellular mass formed of a composition comprising a water-insoluble polymer of isobornyl methacrylate and methyl methacrylate obtained by polymerizing isobornyl methacrylate and methyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the total amount of isobornyl methacrylate and methyl methacrylate being from 1 to 75% of the weight of the resultant polymer and the proportion of isobornyl methacrylate being at least 20% of the total weight of methacrylate.

13. As an article of manufacture, a cellular mass formed of a composition comprising a mixture of water-insoluble polymers comprising (1) a polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer, and (2) a natural rubber.

14. As an article of manufacture, a cellular mass formed of a composition comprising a mixture of water-insoluble polymers comprising (1) a polymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstyrene, and acrylonitrile, the proportion of isobornyl methacrylate being from 1 to 75% by weight of the resultant polymer, and (2) a polymer of 60 to 100% of butadiene with up to 40% respectively of styrene.

15. As an article of manufacture, a cellular mass formed of a composition comprising a mixture of water-insoluble polymers comprising (1) a copolymer of isobornyl methacrylate obtained by polymerizing isobornyl methacrylate by means of a free-radical polymerization initiator in an aqueous dispersion of a polymer selected from the group consisting of natural rubber and copolymers of 60 to 85% by weight of a conjugated diolefin with 15 to 40% by weight of a member selected from the group consisting of styrene, methylstryene, and acrylonitrile, the proportion of isobornyl methacrylate being from 1 to 75% by weight of the resultant polymer, (2) a natural rubber, and (3) a polymer of 60 to 100% of butadiene with up to 40% of styrene.

16. A water-insoluble polymer of isobornyl methacrylate obtained by polymerizing isobornyl methacrylate by means of a free-radical polymerization initiator in an aqueous dispersion of a copolymer of 60 to 85% of butadiene with 15 to 40% of styrene, the proportion of isobornyl methacrylate being from 1 to 75% by weight of the resultant polymer.

17. A water-insoluble polymer of isobornyl methacrylate obtained by polymerizing isobornyl methacrylate by means of a free-radical polymerization initiator in an aqueous dispersion of a copolymer of 60 to 85% of butadiene with 15 to 40% of methylstyrene, the proportion of isobornyl methylacrylate being from 1 to 75% by weight of the resultant polymer.

18. A water-insoluble polymer of isobornyl methacrylate obtained by polymerizing isobornyl methacrylate by means of a free-radical polymerization initiator in an aqueous dispersion of a copolymer of 60 to 85% of butadiene with 15 to 40% of acrylonitrile, the proportion of isobornyl methacrylate being from 1 to 75% by weight of the resultant polymer.

References Cited in the file of this patent

UNITED STATES PATENTS 2,422,550     Jacobson  ---------------- June 17, 1947

OTHER REFERENCES

Blount et al.: "Monomers," copyright 1951, "Esters of Methacrylic Acid Other Than Methyl Methacrylate," page 50.